SEMICONDUCTOR BATTERY

Filed Feb. 13, 1961

INVENTORS
JAMES B. WEDDELL
WALTER PRECHT

BY [signature]

ATTORNEY

United States Patent Office 3,304,445

Patented Feb. 14, 1967

3,304,445

SEMICONDUCTOR BATTERY

James B. Weddell and Walter Precht, Baltimore County, Md.; said Weddell assignor to Martin Marietta Corporation, a corporation of Maryland Filed Feb. 13, 1961, Ser. No. 88,965
19 Claims. (Cl. 310—3)

This invention relates to improved method and means for converting the energy of nuclear radiations into electrical energy and more specifically it relates to a battery device having a semiconductive thermoelement which employs a body portion having an isotope or impurity distributed therein in decreasing concentration axially along the said body.

As is known in the art, semiconductor batteries have been devised utilizing p-n junction configurations in combination with externally produced irradiation. Such prior arrangements are operationally restricted, however, by a multitude of undesirable characteristics. Particularly, the batteries of junction type semiconductors typically using such materials as germanium or silicon are restricted to operation at essentially low temperatures primarily because the secondary electrons and holes produced by ionization of the semiconducting battery material undergo trapping and recombination as well as scattering due to the existence of phonons. A phonon may be defined here as a quantum of the lattice vibration which is manifested in the form of heat. Therefore, as the temperature of the semiconductor increases, more heat energy is introduced and the electrons and holes tend to combine much more rapidly, thereby to lower the efficiency of the device. Of course, the operating temperature range of junction semiconductor batteries is also somewhat limited by the lower melting points of typical semiconductor materials.

Efficiency is also decreased by the diffusion of the semiconducting materials across their common union, which makes the junction broader and diminishes its effect in rectifying electron and hole currents. The batteries are further limited to operate with substantially lower radiation quantities, since a relatively intensive irradiation results in semiconductor material characteristic degradation formed from Frenkel defects and the like.

It is, therefore, a purpose of this invention to provide a radioactive battery employing semiconductor materials which are composed of either p-type or n-type semiconducting materials, and in which there is no p-n junctioning. More particularly, it is desired to provide a semiconductor battery capable of substantially efficient operation in high ambient temperature surroundings. A further object of this invention is to provide a semiconductor battery having a high inherent strength and capable of sustaining efficient operation under conditions of high impact as might be experienced in lunar landing applications and the like. Another aspect is to provide a radioactive battery having operational characteristics which are not inhibited or damaged by impinging radiation induced thereupon.

Accordingly, the invention provides a more efficient means for converting the energy of nuclear radiations into electrical energy by providing a body of semiconducting material having an inhomogeneous concentration of radioisotope in mixture therewith, said body having a first region of maximum concentration of a radioisotope and a second region spaced from the first region having a minimum concentration of radioisotope. The concentration of radioisotope varies so as to decrease from the first to the second region in a monotonic manner and the isotope, through transmutation, provides a daughter product impurity evolved from the decay of the isotope. It follows then that the impurity has a similarly disposed concentration. Thusly disposed, the impurity may evolve a tilting of the lower edge of the conduction energy band and the upper edge of the valence band of the semiconductor, thereby to establish a quasi electric field along the semiconductor body. A quasi electric field in combination with charge carriers produced by irradiating the semiconducting material with emission of the radioisotope provides charge carriers influenced by the electric field to establish the availability of electric energy within the body.

A more particular aspect of the invention may employ a battery comprising a body of semiconducting thermoelectric material having an inhomogeneous concentration of impurity disposed within the said body and varying so as to decrease in essentially linear fashion from one portion of the said body to another spaced therefrom. The battery is subject to radioactive emission as well as heat energy so as to provide a potential of electric energy derived from charge carriers in a quasi field, in addition to a complementary electric potential derived from the union of heat energy with the thermoelectric properties of the body material.

A further aspect of the invention may employ a battery arrangement as described having a radioactive addition to provide an electron-voltaic effect and additionally, a complementary thermoelectric effect.

These and other objects of the invention are further described by the following discussion, examples and related drawings in which.

Figure 1:
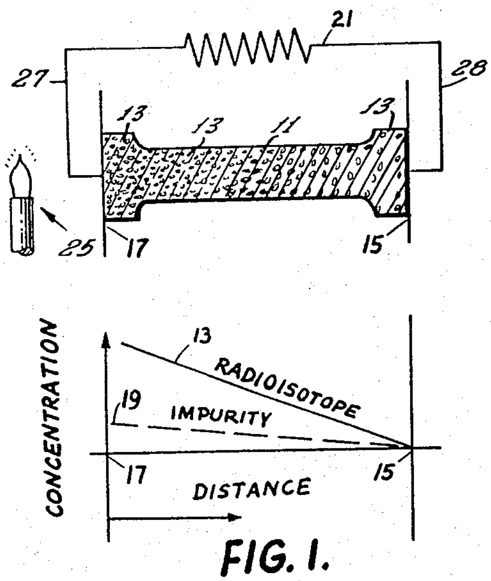
FIGURE 1 is a schematic diagram of a radioactive battery according to the invention in conjunction with a graph read in relation therewith showing the distribution of the radioisotope and impurity concentrations within the battery.
Figure 2:
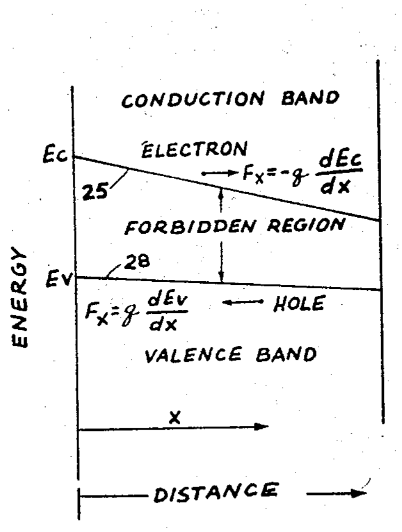
FIGURE 2 is an energy level diagram for describing the theory of the device, and is shown in spatial relationship with the battery arrangement and the impurity concentration diagram of FIGURE 1.

Referring to FIGURE 1, a conventional semiconductor battery arrangement is depicted including a body member 11 of semiconducting material. Typical body member materials which may be employed with the instant invention are those of a family of ultra high temperature, mechanically strong thermoelectric materials. The body member materials may be found characterized as having resistivity substantially defined within a range between 100 microohm centimeters and 0.10 ohm centimeters and may include but are not restricted to a group of titanates of certain elements in the alkaline earth and rare earth groups including, in particular, cerium and strontium. The body members may also contain additions of certain metals including iron, chromium, molybdenum or others of the transition series; the amount of metallic addition present may be from 100 parts per million to 30% by weight. The body members are prepared by pressing and firing in hydrogen at a temperature of approximately 1475° C. These materials are characterized by n-type semiconductivity and a Seebeck coefficient from minus 100 to minus 400 micro-volts per degree centigrade. For purposes of the present example, however, it is assumed that strontium titanate with additions of iron is employed with a body member to yield an n-type semiconducting material. Body member 11 also has included in mixture therewith an inhomogeneous concentration of an impurity which, as in the case of the present example, may be a radioisotope 13 emitting charged particle radiation and/or electromagnetic radiation and having a daughter product formed from the decay thereof. It is preferred that the radioisotope have a half-life of at least thirty days. The radioisotope, or impurity concentration is not uniformly distributed along the body member, however, a typical distribution of which is depicted at 13 in FIGURE 1 wherein the concentration along body member 11 varies in essentially linear fashion from a minimum concentration as at 15 to a maximum concentration at 17. It may be observed that in the present invention there is no junction of semiconducting materials, instead, the variation in valence and conduction band energies is uniform throughout the material rather than varying rather abruptly at a junction. In the case of donor semiconductor arrangements there is a gradual transition from a maximum extent of n-type behavior to a minimum n-type behavior without necessarily a transition to a p-type behavior. Of course when using an acceptor type semiconductor the converse is true. For the present example the isotope distributed within the body portion is chosen to be strontium–90, the daughter product impurities from which will effect a donor type behavior, since the radioisotope will decay to form impurities yttrium–90 and thence zirconium–90. Of course it is understood that other emissive sources may be utilized including those divorced from mixture within the body portion, providing a suitable gradient-defining impurity or doping is disposed within the semiconductor in the inhomogeneous fashion described. A typical representation of the concentration of impurity across the semiconductor body is shown at 19 and, as in the case of distribution 13 of the radioisotope, the distribution 19 of the impurity varies in essentially linear fashion from 15–17 in a way determined by the initial isotope concentration. The distribution thereby serves to evolve a phenomena hereinafter described called a "quasi electric field" across the body member 11. In the example, beta particles emitted by the isotope concentration ionize the semiconductor, injecting electrons into the conducting band thereof and forming holes in its valence band. These electrons serve to provide carriers within the semiconductor which are accelerated by a quasi electric field having been induced by the existence of a gradient formed through the above described unique distribution of impurity concentration. If charge carriers are thusly induced into the interior of the semiconductor 11 which contains a concentration gradient of a suitable impurity, and a load impedance 21 is connected in series therewith by connections 27 and 28, a current will flow through the arrangement. The power output of the battery can be increased by increasing the temperature differential along the body member 11, for instance, by heating the end 17 thereof with an external heat source 25. The particular theory of that portion of the invention which relates to the provision of a quasi electric field as divorced from considerations of radioactivity, within a semiconductor, stems from observations by H. Kramer in a publication entitled, "Proceedings of a Symposium on Solid State Phenomena in Electrical Circuits," Brooklyn Polytechnic Institute, Interscience Publishers, New York, 1957. The quasi electric field is manifested in a "tilting" of the upper edge of the valence band and the lower edge of the conducting band of a semiconductor in such a way that the partial derivative of the energy of the upper edge of the valence band with respect to the longitudinal axis X of the semiconductor body is proportional to the impurity concentration gradient. A similar disposition holds the lower edge of the edge conduction band, however, the two band edges in general are not tilted with equal slope. Thusly, the magnitudes of the forces on electron and holes are unequal across the semiconductor body and a potential difference is evolved thereby. Referring to FIGURE 2, an energy level diagram applicable to the instant invention graphically depicts a "tilting" of the energy bands. In the figure, at the upper edge of the valence energy band 28, $\vec{E}_v$ satisfies the equation:

$$\vec{E}_v = a_1 \nabla C$$

where C is the impurity concentration, $a_1$, is a constant, and $\nabla$ is the operator $(\vec{i}\partial/\partial x + \vec{j}\partial/\partial y + \vec{k}\partial/\partial z)$, $\vec{i}, \vec{j}$, and $\vec{k}$ being vectors of unit length in the $x$-, $y$- and $z$-directions respectively. In similar fashion, the lower edge of the conduction band satisfies the equation: $\nabla E_c = a_2 \nabla C$ where $E_c$ represents the upper edge of the conduction energy band 25, $a_2$ is a constant, $\nabla$ is an operator as described hereinabove and C, as before, is the impurity concentration.

The force $\vec{F}_e$ on an electron in the conduction band is:

$$F_e = q \nabla E_c$$

where $q$ is the magnitude of the charge on the electron. The negative sign of $q$ does not appear because of the convention that $E_v$ and $E_c$ refer to energy states of a negatively charged particle.

The force $\vec{F}_h$ on a hole in the valence band is:

$$\vec{F}_h = -q \nabla E_v$$

Except for differences in the constants $a_1$ and $a_2$, it is seen that the above-described forces are the same as those resulting from an external electric field described by the equation:

$$E = a \nabla C$$

Accordingly, the "tilting" of the energy bands as depicted in FIGURE 2 can be observed in comparing the two above-described equations:

$$\nabla E_v = a_1 \nabla C$$

and $$\nabla E_c = a_2 \nabla C$$

the existence of a quasi-electric field being observed through their relationship.

The radiations emitted by the radioisotope source interact with the valence bands of the semiconductor material. With the incoming radiation having a minimum quantum energy which is equal to or greater than the energy gap of the empty or forbidden region, the aforesaid charge carriers (electrons and holes) are liberated within the semiconductor battery body. In FIGURE 2, the force F on either a hole or electron is directionally indicated, for the example, by an arrow in conjunction with a generalized expression for force:

$$F_x = q\, dE_c/dx$$

Figure 4:
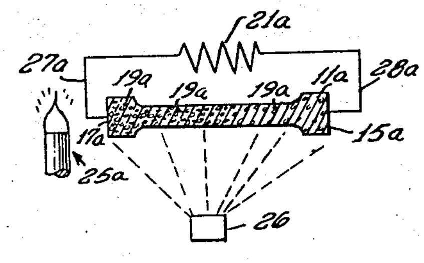
FIGURE 4 is a schematic diagram of an alternate form of a battery according to the invention.

FIGURE 4 illustrates an alternate form of the invention utilizing an external irradiating source. As shown therein, the body member 11a comprises a semi-conducting material similar to that employed in the embodiment of FIGURE 1, i.e., for instance, it may comprise strontium titanate with additions of iron. In this case a suitable impurity 19a zirconium, is also included within the body member 11a having a concentration therein which decreases along the body member essentially linearly from one end 17a to the other end 15a. This variation of the impurity 19a creates a quasi-electric field across the body member 11a which is then irradiated by an external source of radiation 26 to produce charge carriers within the body member. Connections 27a and 28a connect a load impedance 21a in series with the body member to produce a current flow through the system. Additionally, the energy output of the battery can be increased by creating a temperature differential across the body member 11a, for instance, by heating the end 17a thereof with an external heat source 25.

A more precise representation of the operation of a thermoelectric device as described is provided in the accompanying Example I.

EXAMPLE I

A pellet of $SrTiO_3$ containing 0.5 curie of Sr–90 was fashioned. The cylindrical pellet consisted of five parallel layers, the amount of Sr–90 decreasing approximately uniformly from layer to layer, with approximately 0.17 curie in the first layer and 0.033 curie in the fifth layer. The pellet was prepared by pressing and firing smaller portions or layers in hydrogen at a temperature of approximately 1475° C. for approximately sixteen hours. The pellet, formed by the combination of the five layers, was thereby provided with a relatively uniform gradation of impurity rating from a maximum impurity addition at one end to a minimum impurity addition at the other end. The pellet was observed to have an electro-motive force between its two ends of approximately 300 micro volts in the absence of external sources of heat. Most of this E.M.F. resulted from the internal generation of heat within the pellet by the radioactive material included within it. In order to observe the E.M.F. produced by the electron-voltaic effect, it was necessary to place an external electrical source of heat near the end of the pellet which contained the minimum amount of strontium–90. The external heat source thus compensated the internal radioisotope heat source so that no heat flowed through the pellet within the limits of experimental error. The residual E.M.F. of 40 microvolts was due to the isothermal electron-voltaic effect. The final compacted assembly of layer was 1.3 cm. long and 0.6 cm. in diameter. The completed pellet was placed in a sealed container between two 1100° F. aluminum pressure contacts. The temperature of the pellet was 25° C. Thermocouples were placed 0.15 cm. away from either end of the pellet inside of the aluminum contacts. The temperature difference between the ends of the pellet was held below 0.01° C. by application of heat to the contact at the isotope poor end. The thermocouple voltages and the intrinsic open circuit E.M.F. of the pellet were measured by means of a Leeds and Northrup type K–3 potentiometer.

The pellet was observed to generate an open circuit E.M.F. of 40 microvolts, and a conventional electrical current flowed out of the end of the pellet having maximum istope concentration. This polarity indicates n-type semiconductivity.

Because of the selection of body member materials having substantially high melting points, the battery as described is characterized by providing an energy generator operable under conditions of high ambient temperature. It is also characterized by being operable with high energy impinging radiation. This combination of operational advantages is brought about by the annealing of lattice structure interstitial vacancy defects or Frenkel defects as they occur from high energy irradiation, through the relatively higher temperature operating conditions. For the instant example, these operating temperatures may range from approximately 50° C. to 1300° C.

By utilizing these same ambient heat energy characteristics during the operation of the battery, means may be provided to effect a generation of electricity utilizing the thermoelectric properties of the body material. These thermoelectric properties are found to combine in an additive manner with the electron voltaic effect as described above, and as will be described, the resultant energy output of a battery using both effects is higher than the sum of the energy generations provided by the individual effects.

Although the varying concentration of radioisotope within a body member, as is depicted in FIGURE 1, may provide an integral heat source for activating the thermal properties of the thermoelectric semiconductor, as shown in Example I, another embodiment of the invention may utilize an external source of heat to evolve a thermal gradient across the arrangement. By applying heat to the "impurity rich" end of the element, a thermal gradient is established. The secondary charge carriers (electron in a donor type semiconducting material) made available by ionization are assisted to move through the semiconductor by the gradient of the electro-chemical potential caused by the temperature gradient in the element. As the above-described ionization is effected in the impurity rich and heated end of the battery member, the electrons injected into the conduction band by emissive collision are available to add to the thermoelectric current, the current resulting from their drift in the quasi-electric field.

A representation of the inter-action of thermoelectric effects and electric-voltaic effects in a device which converts the energy of the decay of strontium–90 to electrical energy is provided in the accompanying Example II.

EXAMPLE II

A pellet was prepared having the composition indicated in the following table:

TABLE I

| Segment | Wt. Percent $SrTiO_3$ | Wt. Percent Fe | Wt. Percent $ZrH_x$ |
|---|---|---|---|
| *a* | 58.00 | 40 | 2.00 |
| *b* | 58.25 | 40 | 1.75 |
| *c* | 58.50 | 40 | 1.50 |
| *d* | 59.00 | 40 | 1.00 |
| *e* | 59.50 | 40 | 0.50 |
| *f* | 59.75 | 40 | 0.25 |

The pellet was thus composed of six layers or segments designated *a*, *b*, *c*, *d*, *e*, and *f* as shown in the table. The pellet was pressed and fired in hydrogen at a temperature of approximately 1475° C. for about sixteen hours. Provision was made to place an electrical heat source near either end of the pellet; to place a five curie strontium–90 beta irradiation source near either end of the pellet; to measure the temperature at each end of the pellet and to measure the potential difference between the ends of the pellet. The following combinations of heating and beta irradiation of the pellet were arranged.

Figure 3:
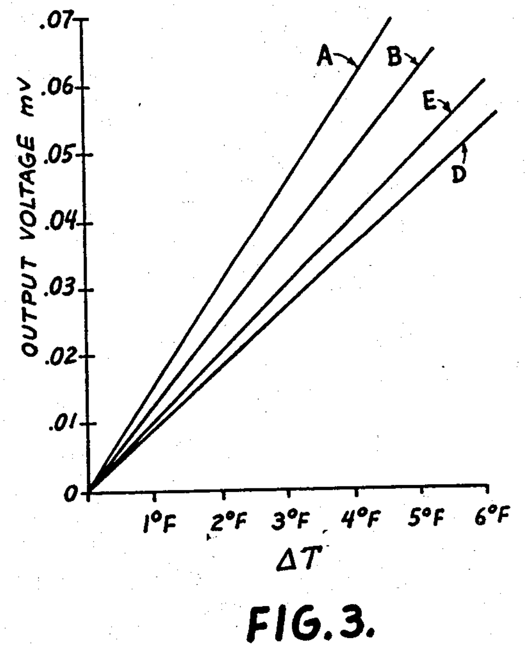
FIGURE 3 is a representation of experimental data as described in conjunction with Example II.

*Case A.*—Heat and beta irradiation were simultaneously applied to the end of the pellet containing the maximum about of zirconium hydride;

*Case B.*—Heat alone was applied to the end described in Case A;

*Case D.*—Beta irradiation was applied to the end described in Case A and heat was applied to the opposite end which contained a minimum amount of zirconium hydride;

*Case E.*—Heat was applied to the end containing the maximum amount of zirconium hydride and beta irradiation was applied to the end containing a minimum amount of zirconium hydride. In adidtion, either end of the pellet was exposed to beta radiation with the application of heat, and the isotherma electron-voltaic E.M.F. was found to be less than five microvolts, the sensitivity of the voltage measuring apparatus used. The output voltage observed in cases A, B, D, and E is plotted as a function of the difference of temperature between the ends of the pellet in FIGURE 3, the letter of each case corresponding to the letter noted on the graph. The following conclusions may be drawn from the data:

(1) The simultaneous application of heat and beta radiation to the end of the pellet containing a maximum amount of zirconium hydride produces a greater E.M.F. than that produced by the application of heat alone to this end.

(2) The application of heat to the end containing a maximum amount of zirconium hydride and the beta irradiation of the opposite end produces an output E.M.F. less than that resulting from the application of heat to the end first mentioned.

(3) The application of heat to the end of the pellet containing a minimum amount of zirconium hydride and the beta irradiation of the opopsite end produces an output E.M.F. smaller than that produced by any of the other three combinations of heat and beta radiation described above.

(4) The Seebeck coefficient of the material depends on which end is at the higher temperature; the Seebeck coefficient is larger if the higher temperature exists at the end containing a maximum amount of zirconium hydride.

(5) The simultaneous heating and beta radiation of the end of the pellet containing a maximum amount of zirconium hydride produces an output E.M.F. greater than the sum of the E.M.F.'s produced by heating of this end alone and the beta irradiation of this end alone.

We claim:

1. A device for directly converting nuclear energy to electrical energy comprising a body of substantially radiation stable semi-conducting material the resistance of which is between 100 microohm centimeters and 0.10 ohm centimeters having a radio-isotope in inhomogeneous mixture therewith capable of charged particle emission with the ratio of said radioisotope to said semi-conducting material therein being at a maximum in a first region of said body and at a minimum in a second region of said body spaced from said first region, the concentration of radioisotope essentially continuous between said regions and varying so as to decrease in a monotonic manner from said first region to said second region, a daughter product impurity evolved from the decay of said radioisotope in mixture within said semi-conductor body, having a concentration essentially proportionate with said concentration of radioisotope so as to establish a quasi electric field within said body, and charge carriers provided in irradiating said semiconducting material with said charged particle emission, said charge carriers essentially influenced by said quasi electric field, thereby establishing the availability of electric energy within said body, and connection means coupled to said regions for supplying said energy to a load circuit.

2. A device for directly converting nuclear energy to electrical energy as defined in claim 1 wherein said semiconducting material is initially intrinsic and said radioisotope is a portion of said semiconducting material.

3. A device for directly converting nuclear energy to electrical energy as defined in claim 1 wherein said body is of p-type semiconducting material.

4. A device for directly converting nuclear energy to electrical energy as defined in claim 1 wherein said body is of n-type semiconducting material.

5. A device for directly converting nuclear energy to electrical energy as defined in claim 1 wherein said radioisotope is of half life greater than thirty days.

6. A device for directly converting nuclear energy to electrical energy as defined in claim 1 wherein said radioisotope is Sr–90.

7. A device for directly converting nuclear energy to electrical energy as defined in claim 1 wherein said body of semiconducting material is selected from a group of titanates consisting of cerium and strontium.

8. A device for directly converting nuclear energy to electrical energy as defined in claim 1 wherein said semiconducting material comprises $SrTiO_3$ with a metal additive.

9. The device of claim 8 wherein said metal additive is selected from a group consisting of iron, chromium and molybdenum.

10. A device for directly converting nuclear energy to electrical energy comprising a body of substantially radiation stable semi-conducting material the resistance of which is between 100 microohm centimeters and 0.10 ohm centimeters having a radioisotope in inhomogeneous mixture therewith capable of charged particle emission with the ratio of said radioisotope to said semiconducting material therein being at a maximum in a first region of said body and at a minimum in a second region of said body spaced from said first region, the concentration of radioisotope continuous between said regions and varying so as to decrease in a monotonic manner from the said first region to said second region, a daughter product impurity evolved from the decay of said radioisotope in mixture within said semiconductor body having a concentration essentially proportionate with said concentration of radioisotope so as to establish a quasi electric field within the said body, and charge carriers provided in irradiating said semiconducting material with said charged particle emission, said charge carriers essentially influenced by said quasi electric field thereby establishing the availability of electric energy within said body.

11. A device for directly converting nuclear energy to electrical energy comprising a body of substantially radiation stable semi-conducting material, the resistance of which is between 100 microohm centimeters and 0.10 ohm centimeters having a radioisotope in inhomogeneous mixture therewith capable of charged particle emission with the ratio of said radioisotope to said semi-conducting material therein being from 1 weight percent to 40 weight percent in a first region of said body and a second region of said body having a smaller weight percent radioisotope than said first region spaced from said first region, the concentration of radioisotope continuous between said regions and varying so as to decrease in a monotonic manner from said first region to said second region, a daughter product impurity evolved from the decay of said radioisotope in mixture within said semiconductor body having a concentration essentially proportionate with said concentration of radioisotope so as to establish a quasi electric field within said body, and charge carriers provided in irradiating said semiconducting material with said charged particle emission, said charge carriers essentially influenced by said quasi electric field thereby establishing the availability of electric energy within said body.

12. A device for directly converting nuclear energy in combination with heat energy to electrical energy comprising a body of substantially radiation stable semiconducting material, the resistance of which is between 100 microohm centimeters and 0.10 ohm centimeters having a radioisotope in inhomogeneous mixture therewith capable of charged particle emission with the ratio of said radioisotope to said semi-conducting material therein being at a maximum in a first region of said body and at a minimum in a second region of said body spaced from said first region, the concentration of radioisotope essentially continuous between said regions and varying so as to decrease in a monotonic manner from said first region to said second region, a daughter product impurity evolved from the decay of said radioisotope in mixture within said semi-conductor body, having a concentration essentially proportionate with said concentration of radioisotope, so as to establish a quasi electric field within said body, and charge carriers provided in irradiating said semiconducting material with said charged particle emission, said charge carriers essentially influenced by said quasi electric field, so as to establish the availability of electric energy within said body, and connection means, coupled to said regions for supplying said energy to a load circuit.

13. A body of substantially radiation stable semiconducting material, the resistance of which is between 100 microohm centimeters and 0.10 ohm centimeters having a radioisotope in inhomogeneous mixture therewith capable of charged particle emission with the ratio of said radioisotope to said semi-conducting material therein being at a maximum in a first region of said body and at a minimum in a second region of said body spaced from said first region, the concentration of radioisotope continuous between said regions and varying so as to decrease in a monotonic manner from said first region to said second region, an impurity evolved from the decay of said radioisotope having a concentration essentially proportioned with said concentration of radioisotope so as to establish a quasi electrical field within said body, and charge carriers provided in irradiating said semiconducting material with said charged particle emission.

14. A device for directly converting nuclear energy in combination with heat energy to electrical energy comprising a body of substantially radiation stable semi-conducting material, the resistance of which is between 100 microohm centimeters and 0.10 ohm centimeters having a radioisotope in inhomogeneous mixture therewith capable of providing a source of charged particle emission with the ratio of said radioisotope to said semi-conducting material therein being at a maximum in a first region of said body and at a minimum in a second region of said body spaced from said first region, the concentration of radioisotope essentially continuous between said regions and varying so as to decrease in a monotonic manner from said first region to said second region, a daughter product impurity evolved from the decay of said radioisotope in mixture within said semiconductor body, having a concentration essentially proportionate with said concentration of radioisotope, so as to establish a quasi electric field within said body, and charge carriers provided in irradiating said semiconducting material with said charged particle emission, said charge carriers essentially influenced by said quasi electric field, means for providing heat energy across said body in a manner wherein said first region is of higher temperature than said second region, thereby establishing the availability of electric energy within said body, and connection means coupled to said regions for supplying said energy to a load circuit.

15. A device for generating electrical energy comprising a body of substantially radiation stable semi-conducting material, the resistance of which is between 100 microohm centimeters and 0.10 ohm centimeters having an impurity in inhomogeneous mixture therewith with the ratio of said impurity to said semi-conducting material therein being at a maximum in a first region of said body and at a minimum in a second region of said body spaced from said first region, the concentration of said impurity essentially continuous between said regions and varying so as to decrease in a monotonic manner from said first region to said second region, said impurity selected to establish a quasi electric field within said body, a first means adapted to irradiate said body to provide charge carriers within said body, said charge carriers essentially influenced by said quasi electric field thereby establishing the availability of electrical energy within said body, and a second means coupled to said regions for supplying said energy to a load circuit.

16. The device of claim 15 including additionally a third means adapted to create a temperature differential between said regions.

17. The device of claim 16 wherein said first means and said third means are external of said body.

18. The device of claim 17 wherein said semi-conducting material is selected from a group consisting of strontium titanate having a metal additive and cerium titanate having a metal additive.

19. The device of claim 17 wherein said impurity is zirconium.

References Cited by the Examiner

UNITED STATES PATENTS

| | | | |
|---|---|---|---|
| 2,830,251 | 4/1958 | Tiley | 321—69 |
| 2,876,368 | 3/1959 | Thomas | 310—3 |
| 3,145,149 | 8/1964 | Imhoff | 176—54 |

CHESTER L. JUSTUS, *Primary Examiner.*

FREDERICK M. STRADER, LEWIS H. MYERS, *Examiners.*

C. F. ROBERTS, G. M. FISHER, *Assistant Examiners.*